(12) United States Patent
Bischoff et al.

(10) Patent No.: US 8,340,660 B2
(45) Date of Patent: Dec. 25, 2012

(54) METHOD AND APPARATUS FOR PAGING ADMISSION RATE CONTROL

(75) Inventors: Helmut Bischoff, Nuremberg (DE); Michael Rupprecht, Aachen (DE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 377 days.

(21) Appl. No.: 12/376,702

(22) PCT Filed: Aug. 7, 2006

(86) PCT No.: PCT/EP2006/007793
§ 371 (c)(1),
(2), (4) Date: Oct. 14, 2010

(87) PCT Pub. No.: WO2008/017312
PCT Pub. Date: Feb. 14, 2008

(65) Prior Publication Data
US 2011/0045824 A1    Feb. 24, 2011

(51) Int. Cl.
*H04W 88/02* (2009.01)

(52) U.S. Cl. .................... 455/426.1; 455/452.1
(58) Field of Classification Search ........... 455/426.1, 455/452.1; 370/230, 232, 235, 312, 395.6; 709/223; 340/540
See application file for complete search history.

(56) References Cited

U.S. PATENT DOCUMENTS

2010/0220643 A1* 9/2010 Qi et al. ............ 370/312
2010/0281051 A1* 11/2010 Sheffi et al. ........ 707/770

* cited by examiner

*Primary Examiner* — Diane Mizrahi

(57) ABSTRACT

The present invention relates to a method of controlling a paging admission rate in a signaling control node of a wireless communication network. After execution of paging message transactions into the wireless communication network, a success rate is determined as ratio of paging messages forwarded to a paging area of the wireless communication network and number of successfully received paging messages. Even if the success rate is below a predetermined lower paging success rate limit, paging message transactions will be continued as long as a certain amount of paging success is maintained.

21 Claims, 5 Drawing Sheets

METHOD AND APPARATUS FOR PAGING ADMISSION RATE CONTROL

FIELD OF INVENTION

The present invention relates to a method of controlling a paging admission rate in a network node of a wireless communication network and to a network node being adapted to execute the inventive control method.

BACKGROUND ART

In wireless communication networks it is common practice to establish mobile terminating transactions, e.g., calls or SMS transactions, by paging the terminating mobiles via a network node, e.g., a mobile switching center MSC.

Generally, to establish the mobile terminating transactions, the network node will receive a first number of paging messages for establishment of communication transactions. In view of the operative state of paging areas in the wireless communication network, the network node will forward a subset of a number of paging messages from the received paging messages to at least one paging area in the wireless communication network for subsequent broadcasting thereof to the terminating mobile terminal. In other words, the network node controls a paging admission rate, which paging admission rate is the ratio between the number of paging messages forwarded to the wireless communication network and the number of paging messages received at the network node. It should be understood that the paging admission rate is a control parameter which varies during operation of the network node.

Also, as a further control parameter for the operation of the network node there is considered a so-called paging success rate as ratio between paging messages successfully broadcast to a paging area in the wireless communication network and the number of paging messages forwarded from the network node to the paging area.

FIG. 1 shows a flowchart of operation for a usual paging flow control method.

As shown in FIG. 1, in the operation of the network node there are used further parameters of control, e.g., an upper paging success rate limit and a lower paging success rate limit.

As shown in FIG. 1, in the network node there will be periodically calculated the paging success rate for ongoing paging message transactions, e.g., every thirty seconds. Then, the determined paging success rate will be compared both to the upper paging success rate limit and to the lower paging success rate limit. Assuming that the paging success rate is larger than the upper paging success rate limit, this will be an indication that it is possible to increase the paging admission rate. If the paging success rate is lying between the upper paging success rate limit and the lower paging success rate limit, then it is appropriate to maintain the paging admission rate unchanged. If the paging success rate is lower than or equal to a lower paging success rate limit, then this is an indication of overload in the wireless communication network, and a decrease of the paging admission rate will be achieved so as to maintain a certain success rate level for ongoing paging message transactions.

As shown in FIG. 1, from the paging success rate the network node decides whether a paging area is working normally or in an overload situation. Here, an overload situation means that base station controllers BSC/radio network controllers RNC serving one or more paging areas are in an overload situation.

As shown in FIG. 1, in case of an overload situation, the network node reduces step by step the number of paging attempts done to the respective paging area, until the paging success rate for the overloaded paging area improves again. Then, the network node increases again the paging admission rate until the paging success rate stabilizes.

As shown in FIG. 1, to decrease/increase the number of paging attempts, the network node uses the paging admission rate which directly depends on the paging success rate. When the paging admission rate is at the highest level, no restriction for paging message transactions is executed, which is the normal traffic scenario when a paging success rate is 100%. Otherwise, when the paging admission rate is at the minimum level, a maximum restriction of 100% is executed, and no paging message transactions are performed any more. Otherwise, for paging admission rates lying between the maximum and the minimum values, more or less paging message transactions will be suppressed.

FIG. 2 shows an operative scenario for the wireless communication network, where the paging control process illustrated with respect to FIG. 1 leads to problems.

As shown in FIG. 2, one may assume without loss of generality that the network node, e.g., the mobile switching center MSC, is connected to two different radio network controllers RNC1, RNC2, where the second radio network controller RNC2 is again connected to a plurality of base stations BS1, BS2, and BS3. Again, without loss of generality, one may assume that only the first two base stations BS1 and BS2 are in the operative mode, while the third base station BS3 is out of operative order. In other words, FIG. 2 illustrates an operative scenario for the wireless communication network, where only two thirds of paging areas are reachable at a specific time of operation.

Further, one may consider an operative condition wherein the network node receives a constant number of, e.g., 1,000 paging messages over several paging control intervals, e.g., thirty seconds. During normal operation, as there is no overload situation, all 1,000 paging message transactions will be processed successfully. Now assuming that the third base station BS3 shown in FIG. 2 goes out of operation, e.g., according to a disaster like an earthquake, only 66% of the base stations will be reachable, e.g., the base station BS1 and the base station BS2, and will be able to handle 66% of the 1,000 paging messages forwarded by the network node MSC.

Further, the paging flow control process executed in the network node MSC will determine a paging success rate of 66%. Assuming that, e.g., the lower paging success rate limit referred to in FIG. 1 set to 75%, the paging flow control process executed by the network node will accordingly start to decrease the paging admission rate, e.g., to a value of 80%. The consequence thereof will be that from the network node MSC, only 800 paging request transactions will be initiated towards the wireless communication network in the next control period. However, as still only 66% of the paging area is reachable, only 528 paging message transactions will be successful. Therefore, the paging flow control process executed in the network node MSC will still see only a success rate of 66% and will therefore again reduce the paging admission rate until finally all paging message transactions are stopped.

From the above, the problem existing with usual paging flow control solutions is that the paging flow control process will regulate down the paging admission rate to zero, if the paging success rate is continuously below the lower paging success rate limit. In other words, even if part of the wireless communication network is operative to handle a certain amount of paging message transactions, nevertheless, this part of the wireless communication network will not be used for paging message transactions due to a static coupling between the paging success rate and the lower paging success rate limit during paging flow control.

SUMMARY OF INVENTION

In view of the above, the technical problem of the present invention is to improve the reduction behavior for the paging admission rate for a method of controlling the paging admission rate in a network node.

According to the present invention, this object is achieved by a method of controlling a paging admission rate in a network node of a wireless communication network, e.g., a signaling control node.

Therefore, according to the present invention it is suggested to not only consider an upper paging success rate limit of, e.g., A %, and a lower paging success rate limit of, e.g., B %, where A %>B %, but to introduce a further control parameter for a paging flow control process, which will be referred to in the following as paging admission rate increase limit C %.

In view of this, according to the present invention it is suggested to leave the option to increase the paging admission rate even when the paging success rate is lower than the lower paging success rate limit but higher than the paging admission rate increase limit. The reason for this is that even though the paging success rate might be lower than the lower paging success rate limit B %, e.g., 75%, it may still be meaningful to continue with paging message transactions as long as part of the paging mechanisms in the wireless communication network remain operative.

E.g., assuming that 66% of the paging mechanisms in the wireless communication network remain operative even after breakdown of certain base stations, it may still be meaningful to continue paging message transactions using this part of the operative paging mechanisms in the wireless communication network. For this reason, according to the present invention, it is suggested to introduce the additional control parameter, i.e. the paging admission rate increase limit being lower than the lower paging success rate limit. It is the paging admission rate increase limit that reflects that part of the paging mechanisms in the wireless communication network are still operative and that it makes sense to increase the paging admission rate as long as the paging success rate is still higher than this paging admission rate increase limit.

In view of the above, an important advantage of the present invention is that the paging flow control process will not stop with paging message transactions, even though the paging success rate is constantly below the lower paging success rate limit, as long as the paging success rate is still above the paging admission rate increase limit. Therefore, according to the present invention, a certain amount of paging message transactions will still be performed without losing paging flow control functionality.

Also, it is important to understand that according to the present invention the paging admission rate increase limit is not necessarily a static value but may be determined as a function of the paging admission rate.

Here, the advantage achieved by the present invention is that it is possible to flexibly adapt the paging admission rate to the current operative state of the paging mechanisms in the wireless communication network. E.g., aiming at simplicity, one option would be to set the paging admission rate increase limit simply to the current paging admission rate. Another option would be to multiply the current paging admission rate by a multiplication factor being equal to or smaller than a value of one. Yet another option would be to select a decreasing function of the current paging admission rate for setting of the paging admission rate increase limit, allowing for a more sophisticated consideration of the operational state of the wireless communication network. Irrespective of which approach is taken, according to the present invention it is supported, as long as there is seen a constant paging success rate, to have the paging admission rate set at a level which is more or less the same value as the current paging success rate.

Also, according to the present invention it is suggested to determine the paging admission rate increase limit according to the related communication transaction type initiated by the related paging message transactions.

This leads to the important advantage of increased flexibility during paging admission rate control. E.g., the present invention supports selective admission of paging message transactions according to different types of communication. E.g., this is of particular advantage in supporting emergency type communication transactions, e.g., emergency calls, etc.

According to the present invention, there is also provided a computer program product directly loadable into the internal memory of a network node of a wireless communication network comprising software code portions for performing the inventive paging admission rate control process when the product is run on a processor of the signaling control node.

Therefore, the present invention is also provided to achieve an implementation of the inventive method steps on computer or processor systems. In conclusion, such implementation leads to the provision of computer program products for use with a computer system or more specifically a processor comprised in, e.g., a network node of a wireless communication network.

This programs defining the functions of the present invention can be delivered to a computer/processor in many forms, including, but not limited to information permanently stored on non-writable storage media, e.g., read only memory devices such as ROM or CD ROM discs readable by processors or computer I/O attachments; information stored on writable storage media, i.e. floppy discs and harddrives; or information convey to a computer/processor through communication media such as network and/or Internet and/or telephone networks via modems or other interface devices. It should be understood that such media, when carrying processor readable instructions implementing the inventive concept represent alternate embodiments of the present invention.

BRIEF DESCRIPTION OF DRAWING

In the following, the best mode of the present invention as well as preferred embodiments thereof will be described with reference to the drawing, in which.

DESCRIPTION OF BEST MODE AND PREFERRED EMBODIMENTS

Figure 1:
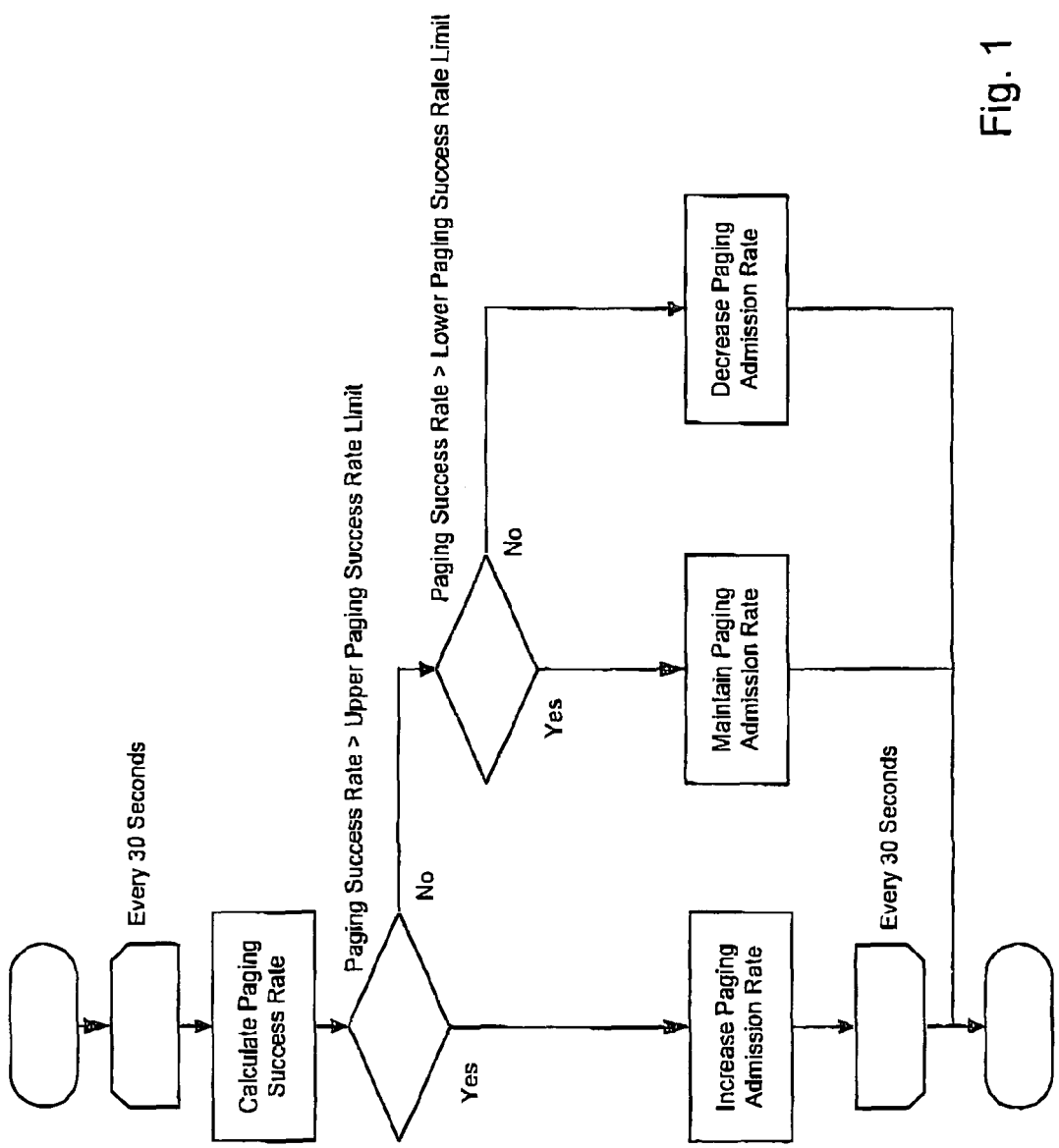
FIG. 1 shows a flowchart of operation for a usual paging flow control process.
Figure 2:
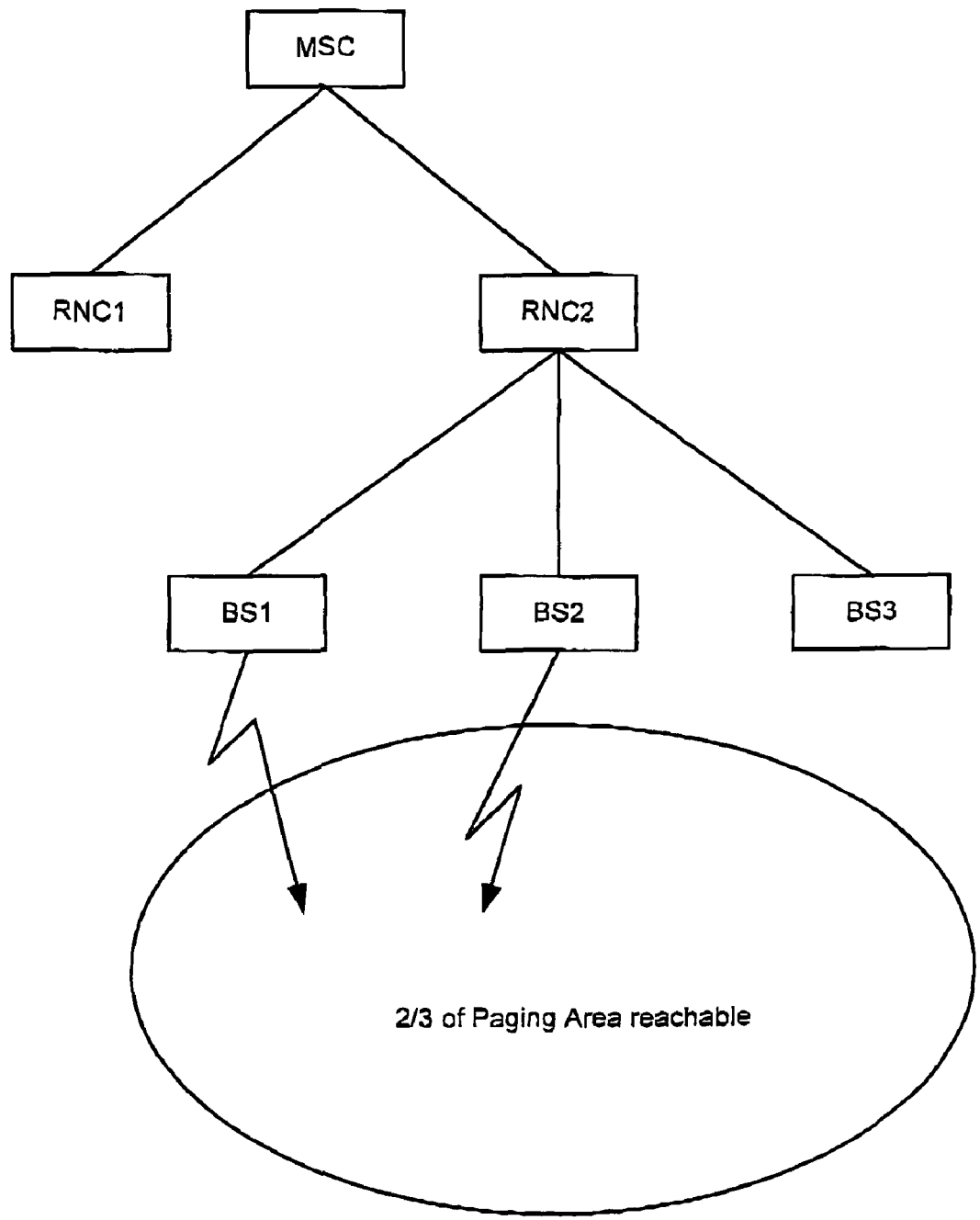
FIG. 2 illustrates an operative scenario for a wireless communication network, where the paging control process shown in FIG. 1 does not achieve appropriate paging flow control results.

In the following, the best mode as well as preferred embodiments of the inventive paging flow control process will be illustrated with reference to the drawing. Insofar as invention-specific functionality is explained, it should be understood that such functionality may either be implemented in software, in hardware, or through a combination thereof.

Figure 3:
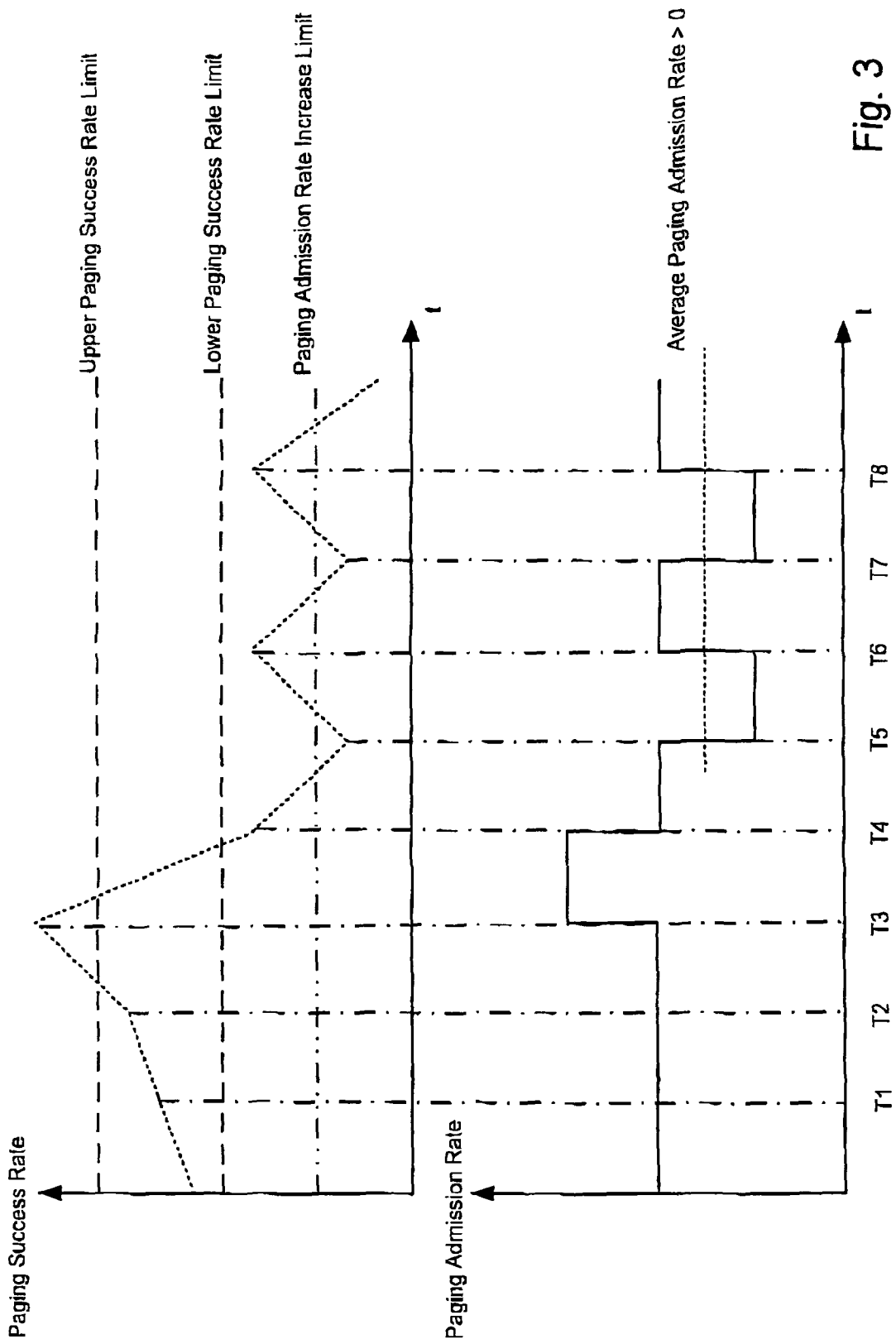
FIG. 3 illustrates the basic insight underlying the present invention.

FIG. 3 illustrates a basic insight underlying the present invention.

A first control parameter illustrated in FIG. 3 is a paging admission rate considered during the paging flow control process. Without loss of generality, one may assume that a network node, e.g., a signaling control node, receives a first number of paging messages for establishment of communication transactions in the wireless communication network. The network node will generally forward a second number of paging messages as subset of the first number of paging messages to a paging area of the wireless communication network for subsequent broadcasting thereof.

As will be explained in more detail in the following, the second number of forwarded paging messages depends on the operative state of paging mechanisms in the wireless communication network. In view of this, the paging admission rate to be controlled determines a ratio between the second number of paging messages and the first number of paging messages.

A second control parameter as illustrated in FIG. 3 is a paging success rate which is defined as a ratio between a third number of paging messages being successfully broadcast in the paging area(s) and the second number of paging messages. Here, the determination of the success rate is commonly known to a person skilled in the art and will therefore not be explained in detail.

As shown in FIG. 3, depending on the paging admission rate, the network node will forward a specific amount of paging message transactions to the paging area(s) in the wireless communication networks which will lead to a specific paging success rate. Then, the paging success rate may be compared against an upper paging success rate limit A % and a lower paging success rate limit B %. Without loss of generality, one may assume that, e.g., the upper paging success rate limit A % is set to 90% and that the lower paging success rate limit is set to 75%. Alternatively, both the upper paging success rate limit and the lower paging success rate limit may be varied during execution of the paging flow control process.

As explained above, as long as the paging success rate remains between the upper paging success rate limit A % and the lower paging success rate limit B %, the paging admission rate will be maintained unchanged for execution of the paging flow control process.

Otherwise, if the paging success rate is higher than the upper paging success rate limit A %, this is an indication that the paging mechanisms in the wireless communication network are fully operative, so that it makes sense to increase the paging admission rate. Otherwise, if the paging success rate is lower than the lower paging success rate limit B %, this is an indication of problems with the paging mechanisms within the wireless communication network and will lead to a decrease of the paging admission rate in general.

As shown in FIG. 3, however, the decrease of the paging admission rate in view of the determined paging success rate is not achieved "blindly" in view of the lower paging success rate limit, but what comes into consideration is a paging admission rate increase limit in addition to control parameters being used in the prior art.

In other words, considering points in time T1, T2, T3, and T4 shown in FIG. 3, this corresponds to the usual paging flow control process. Also, at point in time T5, the paging success rate is continuously going down and also lower than the additional control parameter paging admission rate increase limit, leading to a further decrease of the paging admission rate.

However, assuming that the paging success rate, at a point in time T6, is again above the paging admission rate increase limit, then the paging admission rate will be stepped up again. Here, it should be understood that existing paging flow control mechanisms would continuously reduce the paging admission rate so as point in time T6 leading to a paging admission rate of a value of zero. However, according to the present invention the paging admission rate is again set up corresponding to a value at point in time T1 and T2, respectively.

As shown in FIG. 3, assuming that at a point in time T7 the paging success rate again drops below the paging admission rate increase limit, this will lead to a step down of the paging admission rate, followed by a step up at a point in time T8, when the paging success rate is again above the paging admission rate increase limit.

As shown in FIG. 3, according to the present invention the paging admission rate may still be held above a level of zero though the paging success rate is below a previously existing lower paging success rate limit, as long as the paging success rate remains above a paging admission rate increase limit. This is typically the case when parts of the paging mechanisms within the wireless communication network remain operative, while the other part is going out of operation, e.g., due to maintenance work, external impact like earthquakes, or whatsoever.

In other words and as shown in FIG. 3, if the paging success rate is less than the lower paging success rate limit, according to the present invention it is additionally checked whether the paging success rate is less than the paging admission rate increased limit. Only if this is the case, this is seen as a sign of overload in the paging mechanisms of the wireless communication network, and the paging admission rate is further decreased. If, however, the paging success rate is greater than the paging admission rate increase limit, then the paging admission rate is not decreased further but increased again. The paging flow control process will thereby allow as much paging message transactions as indicated by the paging success rate.

Figure 4:
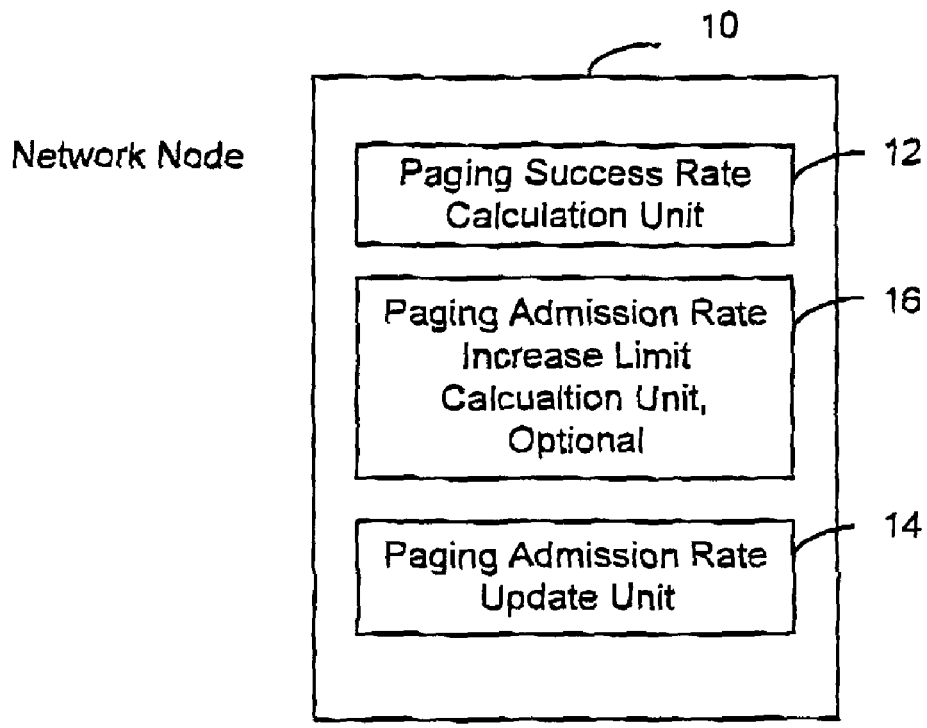
FIG. 4 shows a schematic diagram of a network node according to the present invention.

FIG. 4 shows a schematic diagram of the network node according to the present invention. Without loss of generality, it may be assumed that the network node is, e.g., a signaling control node like a mobile switching center MSC, a base station controller BSC, and/or a radio network controller RNC according to any type of wireless communication network.

As shown in FIG. 4, the network node 10 comprises a paging success rate calculation unit 12 and a paging admission rate update unit 14. Optionally, the network node 10 may comprise a paging admission rate increased limit calculation unit 16, when the paging admission rate increase limit may be flexibly adapted during the paging flow control process according to the present invention.

Figure 5:
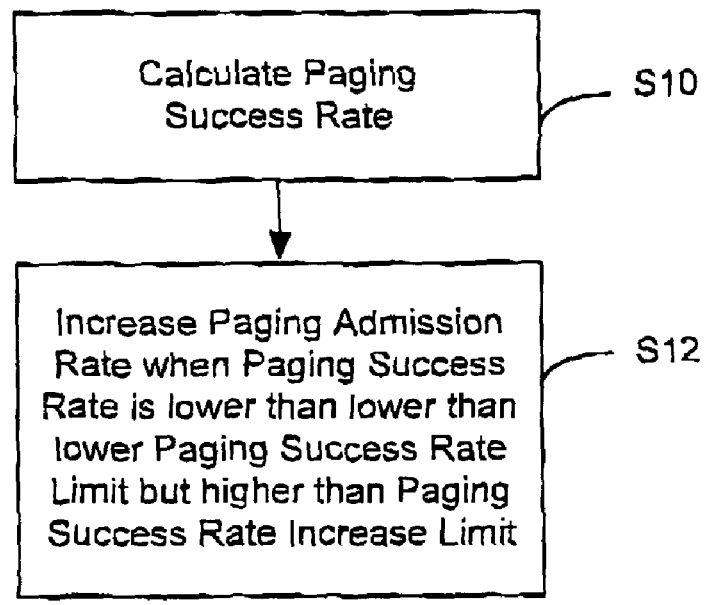
FIG. 5 shows a flowchart of operation for the network node shown in FIG. 4.

FIG. 5 shows a flowchart of operation of the network node shown in FIG. 4.

As shown in FIG. 5, in a step S10, executed by the paging success rate calculating unit, there will be calculated a paging success rate as ratio between a number of paging messages which are admitted at the network node for forwarding to at least one paging area of the wireless communication network and which are successfully broadcast in the at least one paging area, and further the number of admitted paging messages prior to broadcasting and selecting at the network node from the paging messages submitted to the network node.

As shown in FIG. 5, in a step S12, executed by the paging admission rate update unit 14, the paging admission rate will be increased when the paging success rate is lower than the lower paging success rate limit but higher than the paging admission rate increase limit explained with respect to FIG. 3.

Figure 6:
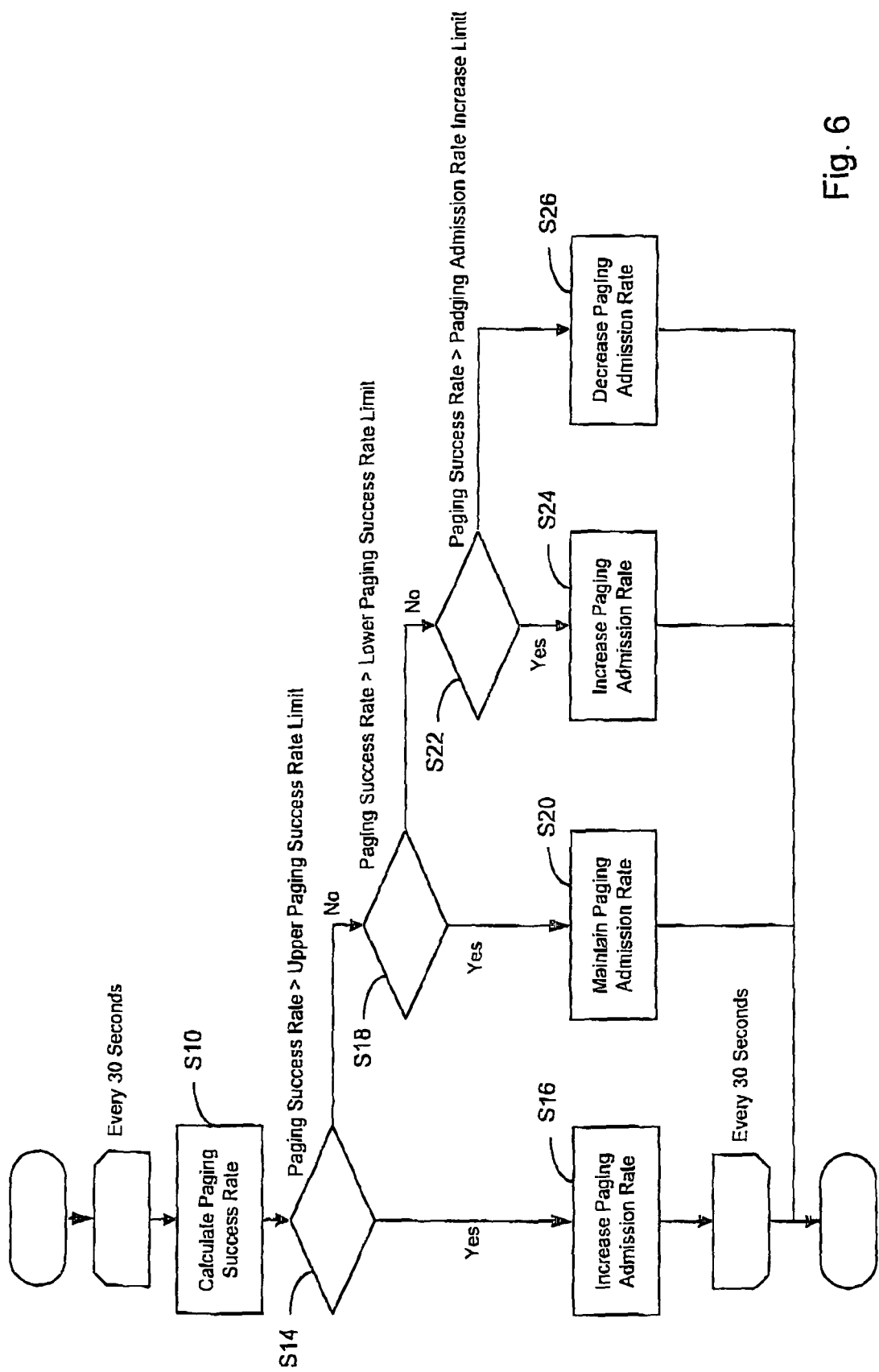
FIG. 6 shows a further detailed flowchart of operation for the network node shown in FIG. 4.

FIG. 6 shows a further detailed operation of the network node 10 shown in FIG. 4.

As shown in FIG. 6, the paging flow control process according to the present invention is executed according to a predetermined paging admission rate update interval. While this paging admission rate update interval is shown to be 30 sec in FIG. 6, it is understood that it may be of any appropriate value or even be flexibly adapted according to, e.g., the number of paging messages submitted to the network node. Here, one can consider to set this value to a very high value when the number of submitted paging messages is very low, while it would be beneficial that the paging admission rate update interval is reduced when the paging message load on the network node 10 is very high.

As shown in FIG. 6, for update of the paging admission rate, initially there is executed a first interrogation step S14 whether the determined paging success rate is larger than the upper paging success rate limit. If this is the case, the paging admission rate will be increased in a step S16, as the high success rate is an indication of available paging resources within the wireless communication network.

As shown in FIG. 3, if the first interrogation step S14 shows that the paging success rate is lower than or equal to the upper paging success rate limit, then follows a second interrogation S18 whether the paging success rate is larger than the lower paging success rate limit. In the affirmative case, the paging admission rate will be maintained unchanged in a step S20.

As shown in FIG. 6, otherwise, i.e. when the paging success rate is not lying within the bandwidth spanned up by the upper paging success rate limit and the lower paging success rate limit, then follows a third interrogation step S22 to determine whether the paging success rate is still larger than the paging admission rate increase limit. In the affirmative case, the paging admission rate will be increased in a step S24. Otherwise, the paging admission rate will be decreased in a step S26.

It should be noted, while FIG. 6 shows an increase or decrease of the paging admission rate, this could be achieved in any appropriate way. A first example would be a constant step-up and step-down of the paging admission rate. A further approach could be an amendment of the paging admission rate according to the current paging admission rate by referring, e.g., to a table specifying an increase or decrease of the paging admission rate depending on a current value of the paging admission rate. Yet another example would be to define the increase and decrease of the paging admission rate as a function of the current value of the paging admission rate.

Further, while in FIG. 6 the paging admission rate increase limit is shown to be constant, it should be understood that generally according to the present invention the paging admission rate increase limit would be determined as a function of the paging admission rate. A first example of such a functional relationship may be to set the paging admission rate increase limit to a predetermined constant value being smaller than the predetermined lower paging success rate limit irrespective of a value of the current paging admission rate. A second example could be a mapping of the current paging admission rate to the paging admission rate increase limit in a one-to-one manner or by multiplying the current paging admission rate with the multiplication factor being smaller than a value of one. A further example of such a functional relationship could be to determine the paging admission rate increase limit as de- or increasing function of the current paging admission rate. Here, this would mean that, e.g., the lower the availability of paging mechanisms within the wireless communication network, the lower the paging admission rate would be, i.e. according to a linear or non-linear relationship.

Further, it should be noted that according to the present invention, the paging admission rate increase limit may also be selected according to the communication transaction type, therefore leaving the option to even more increase the flexibility during the paging flow control process.

Still further, it should be noted that the present invention enables differentiation between local paging and global paging. E.g., the following paging admission rate differentiations could be done:

Paging admission rate of 100%: no paging restrictions done at all;

paging admission rate of 90%: second paging attempts are suppressed for local paging message transactions;

paging admission rate of 80% to 0%: first local paging message transaction are restricted from 100% down to 0%;

irrespective of the paging admission rate, first local paging message transactions for calls will never be restricted; and irrespective of the paging admission rate, global paging message transactions will never be restricted, neither as first nor second or subsequent paging message transactions.

In view of the above, it is understood that the present invention allows for a most flexible control of admission of paging message transactions into a wireless communication network while maintaining paging processes even if part of paging mechanisms within the wireless communication network becomes inoperative. The network node controlling the flow of paging messages will not stop paging message transactions towards paging areas that have a failure rate worse than a lower paging success rate limit. Therefore, the present invention guarantees that a certain amount of paging message transactions will be secured without use of the paging flow control functionality.

The invention claimed is:

1. A method of controlling a paging admission rate in a network node of a wireless communication network, wherein the network node receives a first number of paging messages for establishment of communication transactions within a paging area of the wireless communication network, the network node forwards a second number of paging messages as subset of the first number of paging messages to a paging area of the wireless communication network for subsequent broadcast thereof, and the paging admission rate to be controlled determines a ratio between the second number of paging messages and the first number of paging messages, and wherein the network node further includes at least one processor coupled to a non-transitory computer-readable storage medium storing computer-readable instructions, when executed by the at least one processor, is configured for:

setting, using the at least one processor, a lower paging success rate limit;

setting, using the at least one processor, a paging admission rate increase limit determined as a function of the paging admission rate;

setting, using the at least one processor, an upper paging success rate limit wherein the upper paging success rate limit is larger than the lower paging success rate limit and the paging admission rate increase limit;

calculating, using the at least one processor, a paging success rate as a ratio between a third number of paging messages being successfully broadcast in the paging area and the second number of paging messages; and increasing, using the at least one processor, the paging admission rate when the paging success rate is lower than the lower paging success rate limit but higher than the paging admission rate increase limit.

2. The method according to claim 1, wherein the computer-readable instructions, when executed by the at least one processor are further configured for decreasing, using the at least one processor, the paging admission rate when the paging success rate is lower than the paging admission rate increase limit.

3. The method according to claim 1, wherein the computer-readable instructions, when executed by the at least one processor are further configured for maintaining, using the at least one processor, the paging admission rate when the paging success rate is higher than the lower paging success rate limit and lower than the upper paging success rate limit.

4. The method according to claim 1, wherein the computer-readable instructions, when executed by the at least one processor are further configured for increasing, using the at least one processor, the paging admission rate when the paging success rate is higher than the upper paging success rate limit.

5. The method according to claim 1, wherein the function of the paging admission rate for determining the paging admission rate increase limit is selected from a group comprising:
a setting of the paging admission rate increase limit to a constant value being smaller than the lower paging success rate limit irrespective of a value of a current paging admission rate;
a mapping of the current paging admission rate to the paging admission rate increase limit by multiplying the current paging admission rate with a multiplication factor being smaller or equal to a value of one; and/or
a mapping of the current paging admission rate to the paging admission rate increase limit as decreasing function of the current paging admission rate.

6. The method according to claim 5, wherein the function of the paging admission rate for determining the paging admission rate increase limit is selected according to communication transaction type.

7. The method according to claim 5, wherein the function of the paging admission rate for determining the paging admission rate increase limit is evaluated repeatedly according to a paging admission rate update interval.

8. The method according to claim 1, wherein the computer-readable instructions, when executed by the at least one processor are further configured for setting, using the at least one processor, the paging admission rate to a value of one irrespective of the paging success rate during broadcast of global paging messages.

9. A network node being operated in a wireless communication network for control of a paging admission rate, wherein the network node receives a first number of paging messages for establishment of communication transactions within a paging area of the wireless communication network, the network node forwards a second number of paging messages as subset of the first number of paging messages to a paging area of the wireless communication network for subsequent broadcast thereof, and the paging admission rate to be controlled determines a ratio between the second number of paging messages and the first number of paging messages, comprising:

at least one processor is adapted to set a lower paging success rate limit, a paging admission rate increase limit determined as a function of the paging admission rate, and an upper paging success rate limit wherein the upper paging success rate limit is larger than the lower paging success rate limit and the paging admission rate increase limit;

the at least one processor is further adapted to calculate a paging success rate as a ratio between a third number of paging messages being successfully broadcast in the paging area and the second number of paging messages; and the at least one processor is further adapted to increase the paging admission rate when the paging success rate is lower than the lower paging success rate limit but higher than the paging admission rate increase limit.

10. The network node according to claim 9, wherein the at least one processor is further adapted to decrease the paging admission rate when the paging success rate is lower than the paging admission rate increase limit.

11. The network node according to claim 9, wherein the at least one processor is further adapted to maintain the paging admission rate when the paging success rate is higher than the lower paging success rate limit and lower than the upper paging success rate limit.

12. The network node according to claim 9, wherein the at least one processor is further adapted to increase the paging admission rate when the paging success rate is higher than the upper paging success rate limit.

13. The network node according to claim 9, wherein the at least one processor is further adapted to calculate the paging admission rate increase limit as a function of the paging admission rate by applying a functional relationship selected from a group comprising:
a setting of the paging admission rate increase limit to a constant value being smaller than the pre-determined lower paging success rate limit irrespective of a value of a current paging admission rate;
a mapping of the current paging admission rate to the paging admission rate increase limit by multiplying the current paging admission rate with a multiplication factor being smaller or equal to a value of one; and/or
a mapping of the current paging admission rate to the paging admission rate increase limit as decreasing function of the current paging admission rate.

14. The network node according to claim 13, wherein the at least one processor is further adapted to calculate the paging admission rate increase limit according to communication transaction type.

15. The network node according to claim 13, wherein the at least one processor is further adapted to calculate the paging admission rate increase limit repeatedly according to a paging admission rate update interval.

16. The network node according to claim 9, wherein the at least one processor is further adapted to set the paging admission rate to a value of one irrespective of the paging success rate during broadcast of global paging messages.

17. The network node according to claim 9, wherein it is a signaling control node.

18. A system for controlling a paging admission rate in a network node of a wireless communication network, wherein the network node receives a first number of paging messages for establishment of communication transactions within a paging area of the wireless communication network, the network node forwards a second number of paging messages as subset of the first number of paging messages to a paging area of the wireless communication network for subsequent broadcast thereof, and the paging admission rate to be controlled determines a ratio between the second number of paging messages and the first number of paging messages, comprising:
- at least one processor for setting a lower paging success rate limit;
- at least one processor for setting a paging admission rate increase limit determined as a function of the paging admission rate;
- at least one processor for setting an upper paging success rate limit wherein the upper paging success rate limit is larger than the lower paging success rate limit and the paging admission rate increase limit;
- at least one processor for calculating a paging success rate as a ratio between a third number of paging messages being successfully broadcast in the paging area and the second number of paging messages; and
- at least one processor for increasing the paging admission rate when the paging success rate is lower than the lower paging success rate limit but higher than the paging admission rate increase limit.

19. The system according to claim 18, further comprising at least one processor for decreasing the paging admission rate when the paging success rate is lower than the paging admission rate increase limit.

20. The system according to claim 18, further comprising at least one processor for maintaining the paging admission rate when the paging success rate is higher than the lower paging success rate limit and lower than the upper paging success rate limit.

21. The system according to claim 18, further comprising at least one processor for increasing the paging admission rate when the paging success rate is higher than the upper paging success rate limit.

* * * * *